United States Patent [19]

Nakagome et al.

[11] Patent Number: 4,554,790
[45] Date of Patent: Nov. 26, 1985

[54] MAGNETIC REFRIGERATING APPARATUS

[75] Inventors: Hideki Nakagome, Yokohama; Satoshi Yasuda, Kawasaki, both of Japan

[73] Assignee: Kabushiki Kaisha Toshiba, Kawasaki, Japan

[21] Appl. No.: 701,303

[22] Filed: Feb. 13, 1985

[30] Foreign Application Priority Data

Feb. 13, 1984 [JP] Japan ............................... 59-22769

[51] Int. Cl.$^4$ ............................................. F25B 21/02
[52] U.S. Cl. .......................................................... 62/3
[58] Field of Search ............................................. 62/3

[56] References Cited

U.S. PATENT DOCUMENTS 3,393,526 7/1968 Pearl ........................................... 62/3
4,033,734 7/1977 Steyert, Jr. et al. ....................... 62/3
4,332,135 6/1982 Barclay et al. ............................ 62/3

*Primary Examiner*—Lloyd L. King
*Attorney, Agent, or Firm*—Oblon, Fisher, Spivak, McClelland & Maier

[57] ABSTRACT

A magnetic refrigerating apparatus comprises two pairs of superconductive coils for generating magnetic fields, a tank for receiving helium to be cooled, and a pair of heat absorbers each including a working substance adapted to generate heat when located inside the magnetic field generated by the coils and to absorb heat when located outside the magnetic field. The heat absorbers are alternately transferred between a first position where either of the heat absorbers is located inside the magnetic field and a second position where the heat absorber is located outside the magnetic field so that one of the heat absorbers is in the first position when the other is in the second position, whereby helium is cooled by either of the heat absorbers when the heat absorber is in the second position. The heat absorbers each include working substance pieces arranged at regular intervals along the direction of transfer thereof, and adiabatic spacers each interposed adjacent pieces to prevent direct contact between the pieces.

10 Claims, 2 Drawing Figures

MAGNETIC REFRIGERATING APPARATUS

BACKGROUND OF THE INVENTION

The present invention relates to a magnetic refrigerating apparatus improved in refrigerating efficiency.

Magnetic refrigerating apparatuses which utilize magnetocaloric effect are conventionally known. In these magnetic refrigerating apparatuses, an object to be cooled is deprived of heat by means of a magnetic substance which is cooled by heat insulation and demagnetization. These apparatuses have an advantage over ordinary gas refrigerating apparatuses in being higher in refrigerating capability per unit volume.

The magnetic refrigerating apparatuses require two heat exchange processes to be performed alternately. One of these processes is a heat radiation process in which a magnetic substance or working substance represented by gadolinium-gallium-garnet is rapidly introduced into a magnetic field to be magnetized and heat produced in the working substance is discharged to the outside, while the other is an endothermic process in which the working substance located inside the magnetic field is quickly removed from the magnetic field to be demagnetized so that the object to be cooled is cooled by endothermic reaction of the working substance. Namely, the working substance must be located alternately inside and outside the magnetic field.

To attain this, in the prior art apparatuses of this type, a magnetic field generating device formed of a superconductive coil is provided around the working substance which is rigidly held in position. In adiabatic magnetization, the magnetic field generating device is energized, and a heat radiation system is actuated. In adiabatic demagnetization, on the other hand, the magnetic field generating device is deenergized, and the operation of the heat radiation system is stopped. These processes are repeated alternately.

This arrangement provides advantages such as the apparatus can be miniaturized because a refrigerating cycle can be executed by electrical control only, and the heat radiation process can be improved in reliability since the working substance is stationary.

However, since the magnetic field generating device or superconductive coil is energized pulsatively, energy loss is great, that is, refrigerating efficiency is low.

In order to eliminate such a drawback, a method is proposed in which the magnetic field generating device is energized at all times, and the working substance is mechanically moved so as to be located alternately inside and outside a magnetic field generated by the magnetic field generating device. In this case, it is not advisable to provide a long traveling stroke for the working substance, since a longer stroke will lead to an increase in the overall size of the apparatus. Thereupon, the traveling stroke of the working substance may be shortened by eliminating the so-called low-intensity magnetic field region at the peripheral edge portion of the magnetic field and by reducing the distance between a high-intensity magnetic field region and a region without magnetism. Such an arrangement would, however, result in the following problem. Even though a portion of the working substance is located inside the nonmagnetic region, the remaining portion will always be located inside the high-intensity magnetic field region as the working substance moves, since the high-intensity magnetic field region exists in close vicinity to the nonmagnetic region. If located in the region without magnetism, the working substance will be quickly lowered in temperature. In the aforesaid state, however, part of the working substance is located inside the high-intensity magnetic field region to generate heat therein. The heat from the heat generating portion moves to the low-temperature portion, so that most of the energy is consumed in the heat transfer inside the working substance. Thus, the refrigerating efficiency cannot satisfactorily be improved.

SUMMARY OF THE INVENTION

The present invention is contrived in consideration of these circumstances, and is intended to provide a magnetic refrigerating apparatus using a system in which a magnetic field generating device is energized at all times and a working substance is mechanically driven for linear motion, thereby effectively preventing a reduction of the refrigerating efficiency which is liable to be caused when the traveling stroke of the working substance is shortened, and bringing out the best in the continual magnetic field generation system.

If a working substance is moved between a high-intensity magnetic field and a region without magnetism located in close vicinity thereto, a portion of the working substance will be located inside the high-intensity magnetic field, and the remaining portion inside the nonmagnetic region. In such a situation, the one portion inside the high-intensity magnetic field generates heat, and the other portion outside the magnetic field is cooled, so that heat transfer is caused between the two portions. According to the present invention, however, the working substance is divided into a plurality of sections along the direction of its movement by an adiabatic material, so that the aforesaid heat transfer can be prevented by the adiabatic material. Accordingly, the reduction of the refrigerating efficiency attributed to the heat transfer inside the working substance can be avoided. In other words, it is possible to prevent the efficiency loss which is liable to be caused if the traveling stroke of the working substance is short. Thus, the best in the continual magnetic field generation system can be brought out without resulting in an increase in the overall size of the apparatus.

DETAILED DESCRIPTION OF THE PREFERRED EMBODIMENT

An embodiment of the present invention will now be described in detail with reference to the accompanying drawings.

Figure 1:
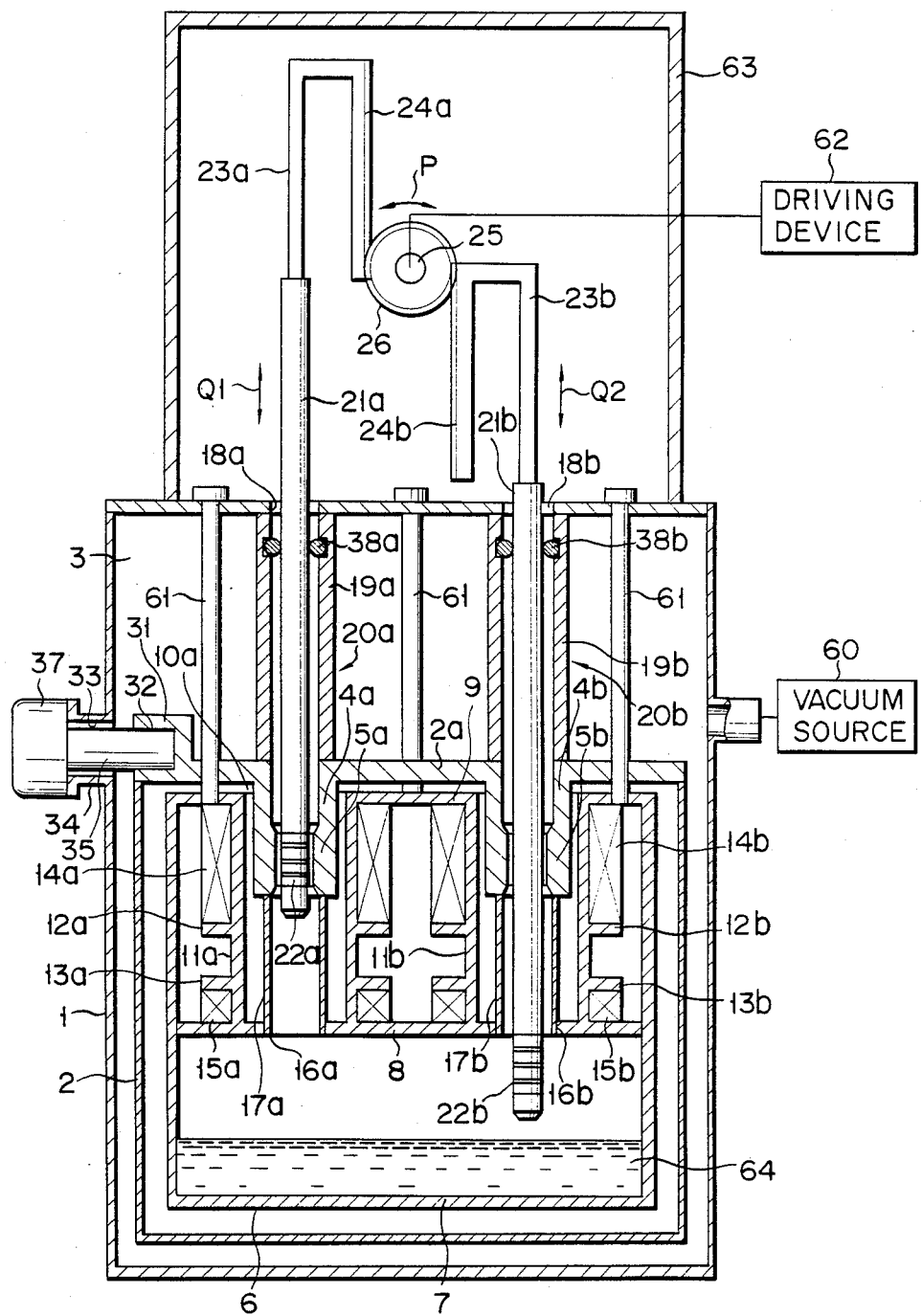
FIG. 1 is a general sectional view schematically showing a magnetic refrigerating apparatus according to an embodiment of the present invention.

FIG. 1 shows an embodiment of the present invention applied to a magnetic refrigerating apparatus for liquefaction of helium.

In FIG. 1, numerals 1 and 2 designate an outer tub and an inner tub housed therein, respectively. The outer tub 1 is formed solely of a material with low thermal conductivity. In the inner tub 2, a top wall 2a is formed of a thick material with high thermal conductivity, and the remaining portion of a material with low thermal conductivity. The top wall 2a has cylindrical portions 4a, 4b projecting downwardly of which lower ends 5a, 5b have thick wall. A space 3 between the outer and inner tubs 1 and 2 is evacuated by a vacuum pump or source 60 connected to the outer tub 2, thus forming a vacuum adiabatic layer.

A helium tank 6 is housed in the inner tub 2, located at a fixed distance therefrom to define a vacuum adiabatic layer. The helium tank 6 is supported in position by supporting rods 61 which protrude downward from the top wall of the outer tub 1. The supporting rods 61 also support the inner tank 2 on their middle portions. The helium tank 6 is formed solely of a nonmagnetic material with high thermal conductivity. The helium tank 6 includes a tank body 7 closed at the top by a top wall 9, and a horizontal partition wall 8 which vertically divides the interior of the tank body 7 into two parts, a coil chamber on the upper side and a helium chamber on the lower side. A pair of cylindrical members 11a and 11b are formed between the top wall 9 and the partition wall 8 so as to be integral therewith and coaxial with cylindrical portions 4a and 4b of the top wall 2a of the inner tub 2. The cylindrical members 11a and 11b are open at both ends. The upper ends of the cylindrical members 11a and 11b open to the upper surface of the top wall 9, while the lower ends terminate at the upper surface of the partition wall 8. The cylindrical members 11a and 11b have an inside diameter greater than the outside diameter of the cylindrical portions 4a and 4b. The cylindrical portions 4a and 4b are inserted untouched in the upper portions of the cylindrical members 11a and 11b, respectively. Slender cylindrical members 17a and 17b are inserted coaxially in the cylindrical members 11a and 11b, respectively. The upper ends of the slender cylindrical members 17a and 17b are connected to the bottom end faces of the cylindrical portions 4a and 4b, respectively, while their lower ends are fixedly fitted in holes 16a and 16b in the partition wall 8 so as to communicate with the helium chamber. First and second outer flanges 12a and 13a protrude integrally from the outer peripheral surface of the outer cylindrical member 11a, arranged at a fixed distance from each other. Likewise, first and second outer flanges 12b and 13b protrude in the same manner from the outer peripheral surface of the outer cylindrical member 11b. Main superconductive coils 14a and 14b are fixedly supported between the top wall 9 and the first outer flanges 12a and 12b, respectively, so as to be coaxial with their corresponding cylindrical members 11a and 11b. Also, auxiliary superconductive coils 15a and 15b are fixed between the partition wall 8 and the second outer flanges 13a and 13b, respectively, so as to be coaxial with their corresponding cylindrical members 11a and 11b. These coils 14a, 14b, 15a and 15b are arranged so that each two adjacent ones are wound in opposite directions. For example, if the one main coil 14a is right-handed, then the other main coil 14b and the one auxiliary coil 15a are left-handed, and the other auxiliary coil 15b is right-handed. The main superconductive coils constitute a main magnetic field generating device, and the auxiliary superconductive coils constitute an auxiliary magnetic field generating device. Since the directions of magnetic fields formed by the main and auxiliary magnetic field generating devices are opposite, the magnetic field produced by the former is deenergized on the latter side by the magnetic field produced by the latter. Thus, weak magnetic field on the latter side is eliminated. In other words, the intensity gradient of the lower side of the magnetic field generated by the main magnetic field generating device is made steep. The two main (or auxiliary) superconductive coils are wound in opposite directions in order to produce attraction between them for the ease of support. These superconductive coils are cooled to a predetermined temperature by liquid helium 64 as a cooling source at the bottom of the helium tank 6 through the medium of helium tank components. The coil chamber containing the superconductive coils is preferably filled with helium gas.

Guide cylinders 19a and 19b vertically extend between the respective top walls of the outer and inner tubs 1 and 2 so as to be coaxial with the cylindrical portions 4a and 4b, respectively. The guide cylinders 19a and 19b are fixed at each end to the top walls of the tubs 1 and 2. Top openings of the guide cylinders 19a and 19b open into circular holes 18a and 18b, respectively, which are formed in the top wall of the outer tub 1. Bottom openings of the guide cylinders 19a and 19b communicate with the cylindrical portions 4a and 4b, respectively. In this embodiment, the diameter of the circular holes 18a and 18b, the inner diameter of the guide cylinders 19a and 19b, the inner diameter of the thin-walled portions of the cylindrical portions 4a and 4b, and the inner diameter of the cylindrical members 17a and 17b are all equal. Preferably, the guide cylinders 19a and 19b and the cylindrical members 17a and 17b are formed of a material with low thermal conductivity. Thus, the guide cylinders 19a and 19b, the cylindrical portions 4a and 4b, and the cylindrical members 17a and 17b constitute cylinders 20a and 20b, respectively, each of which has an intermediate portion (cylindrical portion 4a or 4b) with high thermal conductivity, an upper portion (guide cylinder 19a or 19b) and a lower portion (cylindrical member 17a or 17b) with low thermal conductivity, an upper end opening into the outside space through the circular hole 18a or 18b, and a lower end opening into the helium chamber through the circular hole 16a or 16b.

Rods 21a and 21b are externally inserted for reciprocation into the cylinders 20a and 20b through the circular holes 18a and 18b, respectively. The rods 21a and 21b are columnar members formed of a material with low thermal conductivity, such as Teflon, and have an outer diameter several hundreds microns shorter than the inner diameter of the lower portions 5a and 5b of the cylindrical portions 4a and 4b. Columnar heat absorbers 22a and 22b having a diameter equal to that of the rods 21a and 21b are coaxially mounted on the lower end portions of the rods 21a and 21b, respectively.

Figure 2:
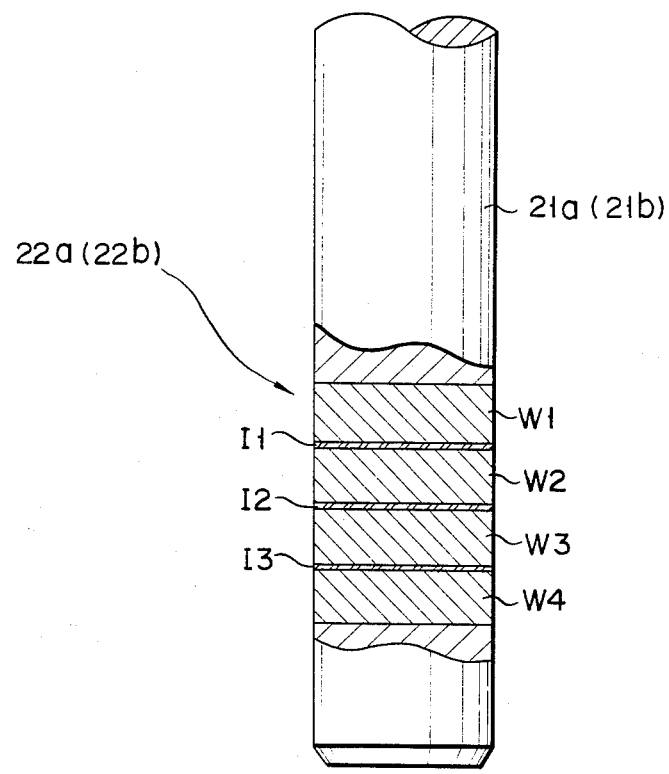
FIG. 2 is an enlarged side view of a heat absorber used in the apparatus shown in FIG. 1.

As shown in FIG. 2, each of the heat absorbers 22a and 22b includes four axially arranged working substance pieces W1, W2, W3 and W4 of substantially equal lengths formed of a magnetic material such as gadolinium- gallium-garnet, and disk-shaped spacers I1, I2 and I3 formed of an adiabatic material such as Teflon and sandwiched between the working substance pieces. For example, the working substance pieces and the spacers are 10 mm and 1 mm, respectively, in thickness. The numbers and dimensions of these pieces and spacers are not limited to those used in this embodiment, and may be selected in various combinations according to the arrangement of the apparatus.

One end of one arm portion of the U-shaped supporting members 23a and 23b is connected at that end portion of the rods 21a and 21b located outside the outer tub 1. The respective other arm portions of the supporting members 23a and 23b face each other in a parallel relation, and racks 24a and 24b are formed individually on the opposed faces, extending vertically. A common pinion 26 is disposed between the racks 24a and 24b so as to be in mesh therewith. A rotating shaft 25 of the pinion 26 is connected to a conventional drive mechanism 62, and can be rocked thereby around a horizontal axis in the direction indicated by arrow P. As the pinion 26 rocks in this manner, the rods 21a and 21b are reciprocated vertically through the medium of the racks 24a and 24b.

A drive transmission mechanism consisting of the pinion 26 and the supporting members 23a and 23b is enclosed by a cover 63. The cover 63 is swingably attached to the upper surface of the top wall of the outer tub 1. When the cover 63 is put on, the drive transmission mechanism is sealed from the outside. The cover 63 can prevent the helium in the helium chamber from leaking to the outside through the cylinders 20a and 20b and the circular holes 18a and 18b. In order to prevent the leakage of the helium through the cylinders 20a and 20b, seal rings 38a and 38b are provided between the cylinders 20a and 20b and the rods 21a and 21b, respectively, so as to fill the gaps between them.

The drive mechanism 62 includes, for example, another pinion fixed to the rotating shaft 25 of the pinion 26, a piston with a rack at one end thereon in mesh with the second pinion, and an air cylinder for reciprocating the piston. For secure sealing inside the cover 63, the rotating shaft 25, which is relatively easy to seal, is preferably projected from the cover 63 to be coupled to the external drive mechanism.

The drive mechanism or device 62 and the drive transmission mechanism are constructed as follows.

In FIG. 1, the heat absorber 22a attached to the lower end portion of the rod 21a is at its top dead center where it is located within the lower portion 5a of the cylindrical portion 4a, while the heat absorber 22b on the rod 21b is at its bottom dead center where it is located between the partition wall 8 and the surface of the liquid helium. Thus, if one of the heat absorbers is at the top dead center, then the other is at the bottom dead center.

A thick-walled portion 31 is formed on part of the peripheral edge of the top wall 2a of the inner tub 2. A cylindrical recess 32 is formed in the peripheral surface of the thick-walled portion 31. A circular hole 33 greater in diameter than the recess 32 is bored through that portion of the peripheral wall of the outer tub 1 which faces the recess 32. An outwardly projecting flange 34 is airtightly attached to the peripheral edge portion of the hole 33. A cooler 37 of a miniature refrigerator is attached to the flange 34. A heat transfer rod 35 of the cooler 37 penetrates the hole 33 to extend into the recess 32 of the top wall 2a. Thus, the heat transfer rod 35 touches and cools the top wall 2a. For this refrigerator, for example, a GM-cycle refrigerator may be used which can provide a temperature as low as 20° K.

The operation of the magnetic refrigerating apparatus with this construction will now be described.

First, let it be supposed that currents capable of generating the magnetic fields in the aforementioned relation flow through the superconductive coils 14a, 14b, 15a and 15b. Also suppose that the cooler 37 is in an operating state. When the cooler 37 is actuated, the top wall 2a is deprived of heat by the heat transfer rod 35. Thus, the cylindrical portions 4a and 4b are kept at a sufficiently low temperature.

When the drive mechanism is operated in this state, the pinion 26 rocks alternatingly as indicated by arrow P in FIG. 1. As a result, the rods 21a and 21b move up and down as indicated by arrows Q1 and Q2. When the one rod 21a starts to ascend, the other rod 21b starts to descend. Thus, the heat absorbers 22a and 22b move up and down between the top and bottom dead centers while keeping a phase difference of 180 degrees from each other. At the top dead center, the heat absorber (22a in FIG. 1) is located fully within the magnetic field generated by the superconductive coils, and is therefore magnetized. At the bottom dead center, on the other hand, the heat absorber (22b in FIG. 1) is located outside the magnetic field, and is therefore demagnetized. In the demagnetized state, the working substance of the heat absorber 22b (22a) absorbs heat. Accordingly, helium gas floating over the surface of the liquid condenses on the surface of the heat absorber 22b (22a). Liquid drops formed by the condensation naturally fall down. Thus, liquefaction of helium is accomplished.

In the magnetized state, the working substance of the heat absorber 22a (22b) generates heat, which is led to the outside space in the following manner. At the top dead center, the heat absorber 22a (22b) never fails to be located within the lower portion 5a (5b). The inside diameter of the lower portion 5a (5b) is a little greater than the diameter of the heat absorber 22a (22b). Therefore, when the heat absorber 22a (22b) is located inside the lower portion 5a (5b), the working substance of the heat absorber 22a (22b) is bound to be directly in contact with or be very close to the inner surface of the lower portion 5a (5b). Therefore, the heat generated by the working substance is quickly discharged into the outside space through the cylindrical portions 4a and 4b and the top wall 2a. Thus, the temperature inside the helium tank 6 will never be increased by the heat from the working substance, ensuring a satisfactory refrigeration cycle.

While the working substance moves alternately between the spaces in- and outside the magnetic field, a situation is established such that a part of the working substance is located inside the magnetic field and the remaining part outside. Since the working substance is adapted to generate heat when located inside the magnetic field and to absorb heat outside, heat transfer is caused inside the heat absorbers 22a and 22b. As a result, a period may possibly exist during which the heat absorbing section is not conducive to the liquefaction of helium. However, if the working substance is divided into a plurality of pieces in the axial direction or in the traveling direction by the adiabatic spacers I1, I2 and I3, as in this embodiment, the adiabatic spacers I1, I2 and I3 can prevent the axial heat transfer inside the working substance. Accordingly, the helium can successfully be liquefied at the heat absorbing section. Thus, with use of the superconductive coils 15a and 15b constituting the auxiliary magnetic field generating device, a high-intensity magnetic field can be brought close to a region without magnetism, so that the transfer stroke required by the heat absorbers 22a and 22b can be reduced to, e.g., 10 cm or less. If this is done, however, the heat absorbers 22a and 22b may obtain both heated and cooled portions while they are moving, lowering the refrigerating efficiency. In this embodiment, however, the axial heat transfer inside the working substance can be prevented by the use of the spacers I1, I2 and I3, so that the problem newly raised by the reduction of the transfer stroke can be settled successfully. Namely, despite the use of the shortened transfer stroke for the working substance, it is possible to improve the refrigerating efficiency and to obtain the aforementioned effects.

Moreover, if the inner diameter of the lower portions 5a and 5b of the cylindrical portions 4a and 4b is set to be a little greater than the outer diameter of the rods 21a and 21b, as in the present embodiment, the lower portions 5a and 5b can serve as guide means for guiding the rods 21a and 21b. With the arrangement of this embodiment, the rods 21a and 21b are inevitably so long that some guide means is required for smooth vertical motion of the rods 21a and 21b. Since the lower portions 5a and 5b can function as the guide means as aforesaid, the components of the apparatus may be reduced in number. When the rods 21a and 21b move up and down inside the lower portions 5a and 5b, respectively, heat is generated by sliding friction. Since the lower portions 5a and 5b are cooled, however, the influence of the heat generation can be avoided. Moreover, according to the system of the embodiment in which two heat absorbers are oppositely moved up and down by means of a single drive source, one of the heat absorbers approaches the magnetic field corresponding thereto when the other goes away from its corresponding magnetic field. Accordingly, magnetic attraction caused between the one magnetic field and its corresponding heat absorber can be reduced by that between the other magnetic field and its corresponding heat absorber. Thus, the driving force may be reduced.

It is to be understood that the present invention is not limited to the embodiment described above, and that various changes and modifications may be effected therein by one skilled in the art without departing from the scope or spirit of the invention.

What is claimed is:

1. A magnetic refrigerating apparatus comprising:
   magnetic field generating means for generating a magnetic field;
   holding means for holding an object to be cooled;
   a heat absorber including a working substance adapted to generate heat when located inside the magnetic field generated by the magnetic field generating means and to absorb heat when located outside the magnetic field; and
   driving means for alternately transferring the heat absorber between a first position where the heat absorber is located inside the magnetic field and a second position where the heat absorber is located outside the magnetic field, whereby the object to be cooled is cooled by the heat absorber when the heat absorber is in the second position, the improvement in which
   said heat absorber includes a plurality of working substance pieces arranged at regular intervals along the direction of transfer thereof, and a plurality of adiabatic spacers each interposed between adjacent pieces to prevent direct contact between the pieces.

2. The magnetic refrigerating apparatus according to claim 1, wherein said magnetic field generating means includes a main magnetic field generating unit for generating a magnetic field in the first position, and an auxiliary magnetic field generating unit located on the second position side of the magnetic field generating means and adapted to generate a magnetic field of lower magnitude opposite in direction to the magnetic field generated by the main magnetic field generating unit so that the two magnetic fields overlap each other.

3. The magnetic refrigerating apparatus according to claim 1, wherein said holding means includes a first tub containing the object to be cooled, a partition wall in the first tub dividing the interior thereof into an upper chamber containing the magnetic field generating means and a lower chamber containing the object to be cooled, and a cylinder extending upward from the object chamber through the magnetic field generating means chamber, and said driving means includes a rod with the heat absorber on the lower portion thereof and capable of reciprocating inside the cylinder, and a drive mechanism for moving the rod.

4. The magnetic refrigerating apparatus according to claim 3, wherein said cylinder includes a lower portion of a material with low thermal conductivity and coupled to the object chamber, an intermediate portion of a material with high thermal conductivity coupled to the lower portion and located in the first position, and an upper portion of a material with low thermal conductivity coupled to the intermediate portion.

5. The magnetic refrigerating apparatus according to claim 4, wherein the intermediate portion of said cylinder has an inside diameter a little greater than the diameters of the rod and the heat absorber and smaller than the inside diameters of the lower and upper portions.

6. The magnetic refrigerating apparatus according to claim 5, wherein said main and auxiliary magnetic field generating units include superconductive coils vertically spaced so as to surround the cylinder.

7. A magnetic refrigerating apparatus comprising: at least a pair of magnetic field generating units for generating magnetic fields,
   holding means for holding an object to be cooled;
   at least a pair of heat absorbers each including a working substance adapted to generate heat when located inside the magnetic field generated by each corresponding magnetic field generating unit and to absorb heat when located outside the magnetic field; and
   driving means for alternately transferring the heat absorbers between a first position where either of the heat absorbers is located inside the magnetic field and a second position where the heat absorber is located outside the magnetic field so that one of the heat absorbers is in the first position when the other is in the second position, whereby the object to be cooled is cooled by either of the heat absorbers when the heat absorber is in the second position,
   said heat absorbers each includes a plurality of working substance pieces arranged at regular intervals along the direction of transfer thereof, and a plurality of adiabatic spacers each interposed between adjacent pieces to prevent direct contact between the pieces.

8. The magnetic refrigerating apparatus according to claim 7, wherein each said magnetic field generating unit includes a main superconductive coil for generating a magnetic field in the first position, and an auxiliary superconductive coil located on the second position side of the magnetic field generating unit and adapted to generate a magnetic field of lower magnitude opposite in direction to the magnetic field generated by the main superconductive coil so that the two magnetic fields overlap each other.

9. The magnetic refrigerating apparatus according to claim 8, wherein said pair of main superconductive coils are arranged at a distance from each other and generate magnetic fields in opposite directions, so that the two coils are urged to attract each other.

10. The magnetic refrigerating apparatus according to claim 7, wherein said driving means includes rods with the heat absorbers on the respective lower portions thereof and capable of reciprocation, racks attached individually to the rods and facing each other, a common pinion disposed between the racks so as to be in mesh therewith, and a drive source for rocking the pinion.

* * * * *